(12) United States Patent
Foskey et al.

(10) Patent No.: US 11,059,566 B2
(45) Date of Patent: Jul. 13, 2021

(54) ADDITIVE MANUFACTURE PROPROTOR BLADE

(71) Applicant: Bell Textron Inc., Fort Worth, TX (US)

(72) Inventors: Christopher Edward Foskey, Keller, TX (US); Andrew Maresh, Lewisville, TX (US)

(73) Assignee: Bell Textron Inc., Fort Worth, TX (US)

( * ) Notice: Subject to any disclaimer, the term of this patent is extended or adjusted under 35 U.S.C. 154(b) by 139 days.

(21) Appl. No.: 16/590,618

(22) Filed: Oct. 2, 2019

(65) Prior Publication Data

US 2021/0101672 A1 Apr. 8, 2021

(51) Int. Cl.
 *B64C 11/26* (2006.01)
 *B64C 29/00* (2006.01)
 *B33Y 80/00* (2015.01)

(52) U.S. Cl.
 CPC .......... *B64C 11/26* (2013.01); *B64C 29/0033* (2013.01); *B33Y 80/00* (2014.12)

(58) Field of Classification Search
 CPC ..... B64C 11/24; B64C 11/26; B64C 29/0033; B33Y 80/00; F05B 2250/283
 See application file for complete search history.

(56) References Cited

U.S. PATENT DOCUMENTS

| 9,840,921 B2 * | 12/2017 | Petellaz | F01D 5/10 |
| 2017/0334548 A1 | 11/2017 | Foskey et al. | |
| 2018/0340421 A1 * | 11/2018 | Woodruff | B64F 5/40 |
| 2019/0063230 A1 | 2/2019 | Oldroyd et al. | |

FOREIGN PATENT DOCUMENTS

FR 2676986 A1 * 12/1992 ............. B64C 11/26

* cited by examiner

*Primary Examiner* — Richard A Edgar
(74) *Attorney, Agent, or Firm* — Shackelford, Bowen, McKinley & Norton, LLP

(57) ABSTRACT

An exemplary proprotor blade assembly includes a structural skin extending spanwise from a root to a tip and along a chord from leading edge to a trailing edge and a structural core positioned inside of the structural skin, the structural skin comprising hex-shaped structures oriented normal to the structural skin.

19 Claims, 6 Drawing Sheets

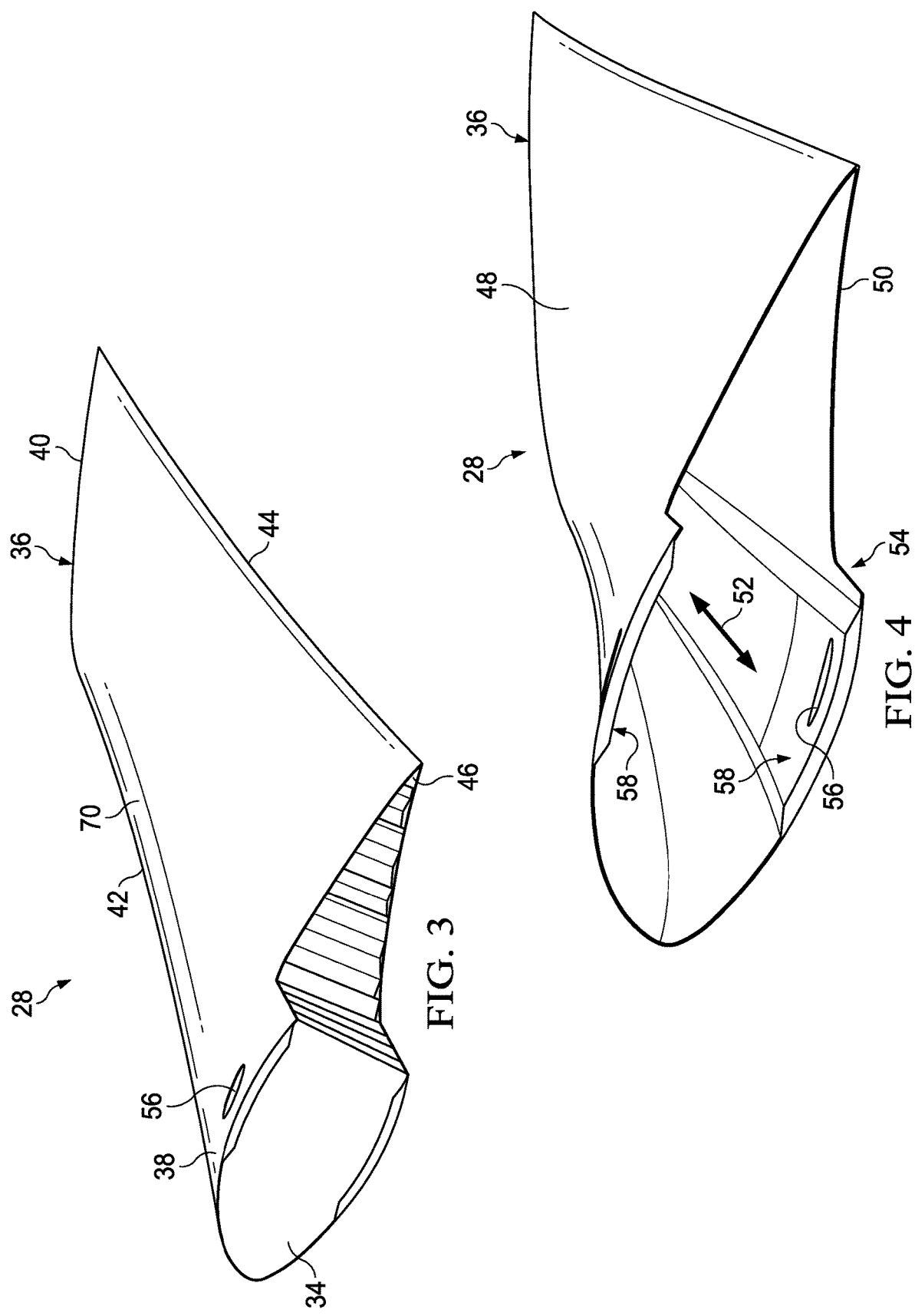

ADDITIVE MANUFACTURE PROPROTOR BLADE

TECHNICAL FIELD

This specification relates to rotor blade assemblies, for example, assemblies of main rotor blades or other rotor blades, of a rotorcraft.

BACKGROUND

This section provides background information to facilitate a better understanding of the various aspects of the disclosure. It should be understood that the statements in this section of this document are to be read in this light, and not as admissions of prior art.

Tiltrotor aircraft typically include multiple rotor assemblies that are carried by the wing member of the aircraft and are generally disposed near the end portions of the wing member. Each rotor assembly may include an engine and transmission that provide torque and rotational energy to a drive shaft that rotates a proprotor including a plurality of proprotor blade assemblies. Typically, the rotor assemblies are capable of moving or rotating relative to the wing member enabling the tiltrotor aircraft to operate between a helicopter mode, in which the rotor assemblies are tilted upward, such that the tiltrotor aircraft flies much like a conventional helicopter and an airplane mode, in which the rotor assemblies are tilted forward. In this manner, the proprotors generate greater lift in helicopter mode than in airplane mode, as the proprotors are oriented to generate greater thrust propelling the aircraft vertically. Likewise, the proprotors generate greater forward speed in airplane mode than in helicopter mode, as the proprotors are oriented to generate greater thrust propelling the aircraft forward.

A conventional rotorcraft blade assembly derives a vast majority of its strength and stiffness from an internal torque tube, often referred to as a spar or D-spar. The remaining volume within a rotor blade is occupied, in part, by a core made of a material such as honeycomb core. An upper skin portion and a lower skin portion are adhesively bonded to the spar and core. Unfortunately, D-shaped spars are structurally complex having tight internal radii and complicated material transitions resulting in a component that is particularly difficult, time consuming and expensive to manufacture.

SUMMARY

An exemplary proprotor blade assembly includes a structural skin extending spanwise from a root to a tip and along a chord from leading edge to a trailing edge and a structural core positioned inside of the structural skin, the structural core comprising hex-shaped structures oriented normal to the structural skin. In accordance with at least one embodiment, the outer structural skin does not dispose an internal tubular spar.

An exemplary rotorcraft includes a wing extending from a fuselage and a proprotor assembly carried by the wing including a plurality of proprotor blade assemblies each having a structural skin extending spanwise from a root to a tip and along a chord from leading edge to a trailing edge, centrifugal force material extending spanwise along the structural skin forming a centrifugal force path, and a structural core positioned inside of the structural skin, the structural core comprising hex-shaped structures oriented normal to the structural skin.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 3 illustrates an exemplary proprotor blade assembly.

FIG. 4 illustrates an exemplary skin of a proprotor blade assembly.

DETAILED DESCRIPTION

Figure 1:
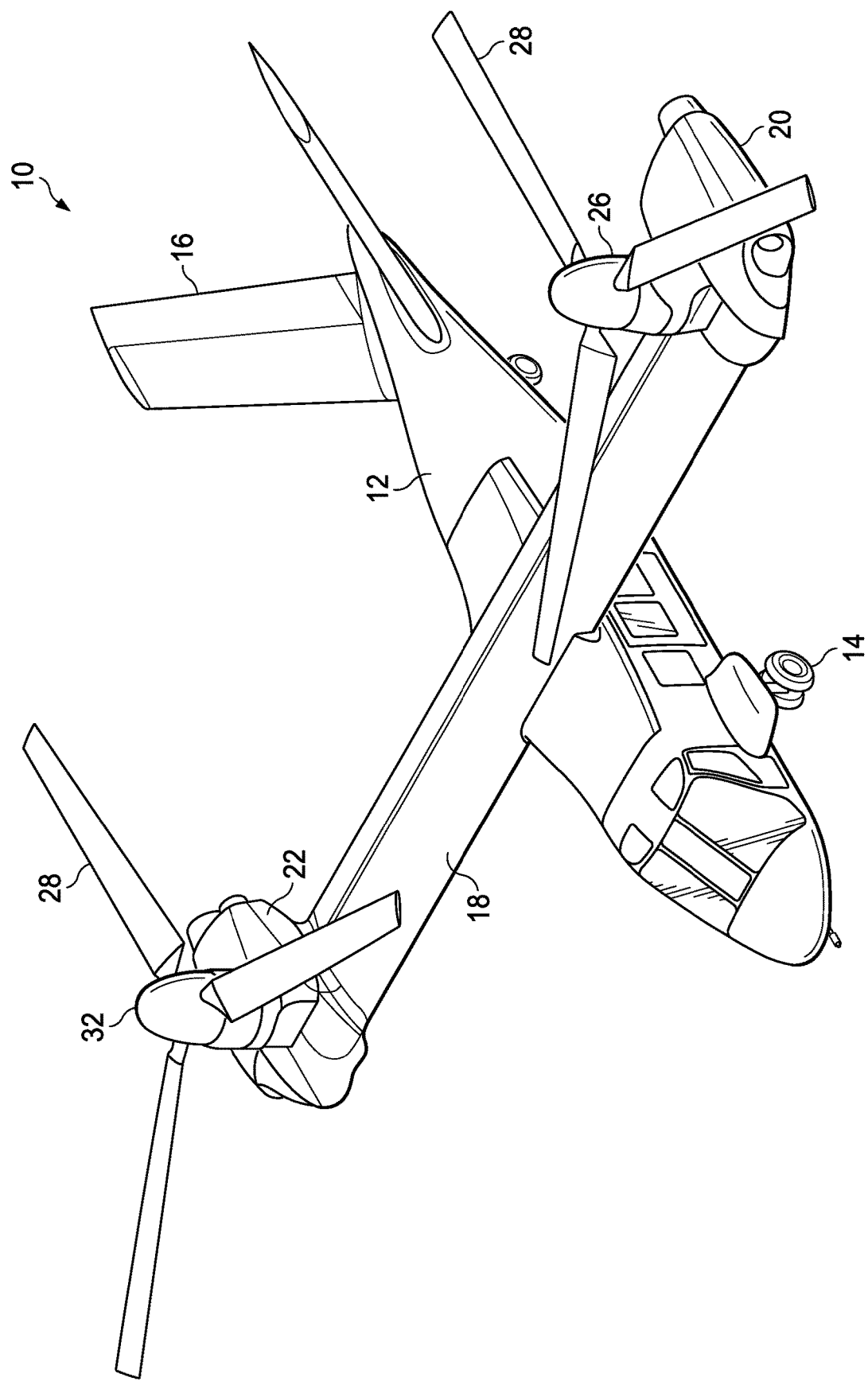
FIG. 1 is a schematic view of an exemplary aircraft in helicopter mode incorporating a blade assembly according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 2:
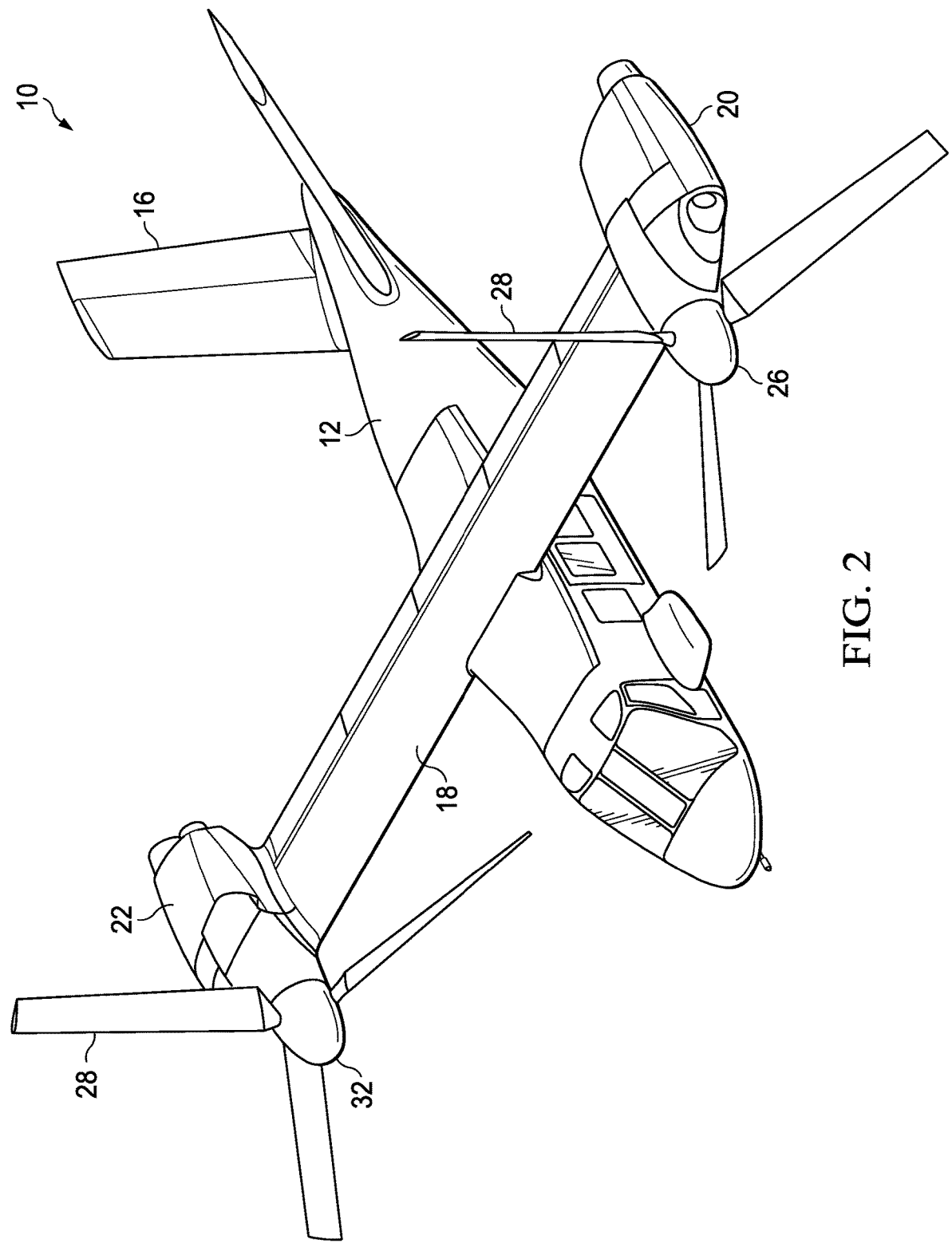
FIG. 2 is a schematic view of an exemplary aircraft in airplane mode incorporating a blade assembly according to one or more aspects of the disclosure.

Referring to FIGS. 1-2 in the drawings, an exemplary aircraft 10 is illustrated as a tiltrotor aircraft. Tiltrotor aircraft 10 includes a fuselage 12, a landing gear 14, a tail member 16, a wing member 18 and propulsion systems 20, 22. Propulsion system 20 includes a fixed engine and a transmission that provide torque and rotational energy to a drive shaft that is operably coupled to a rotatable proprotor 26 including a plurality of proprotor blade assemblies 28. Likewise, propulsion system 22 includes a fixed engine and a transmission that provide torque and rotational energy to a drive shaft that is operably coupled to a rotatable proprotor 32 including a plurality of proprotor blade assemblies 28. The position of rotatable proprotors 26, 32 as well as the pitch of proprotor blade assemblies 28, is determined using a flight control system to selectively control the direction, thrust and lift of tiltrotor aircraft 10.

FIG. 1 illustrates tiltrotor aircraft 10 in helicopter mode, in which rotatable proprotors 26, 32 are positioned substantially vertical to provide a lifting thrust, such that tiltrotor aircraft 10 flies much like a conventional helicopter. FIG. 2 illustrates tiltrotor aircraft 10 in airplane mode, in which rotatable proprotors 26, 32 are positioned substantially horizontal to provide a forward thrust in which a lifting force is supplied by wing member 18, such that tiltrotor aircraft 10 flies much like a conventional aircraft. It should be appreciated that tiltrotor aircraft 10 can be operated such that rotatable proprotors 26, 32 are selectively positioned between airplane mode and helicopter mode, which can be referred to as a conversion mode. Even though proprotor blade assemblies in FIGS. 1 and 2 are illustrated in the context of tiltrotor aircraft 10, it will be understood by those skilled in the art that proprotor blade assemblies 28 can be implemented in a variety of ways on a variety of rotorcraft including, for example, airplanes, helicopters, tiltwing aircraft, quad tiltrotor aircraft, unmanned aircraft and the like. As such, those skilled in the art will recognize that proprotor blade assemblies 28 can be integrated into a variety of rotorcraft configurations.

Referring now to FIGS. 3-10, various aspects of exemplary additive manufacture proprotor blade assemblies 28 are illustrated. Blade assembly 28 includes an additive 3D printed structural core 34 and an inner mold line (IML) tooled structural skin 36 to create a finished bonded blade assembly 28 that does not utilize an internal tubular spar. Proprotor blade assembly 28 extends along a span from a root end 38 to a tip 40 and along the chord from a leading edge 42 to a trailing edge 44. Blade assembly 28 may include a conventional trailing edge wedge 46. Trailing edge wedge 46 may be a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Trailing edge wedge 46 can serve as a structural member of proprotor blade assembly 28 including providing stiffness to proprotor blade assembly 28.

The illustrated structural core 34 is constructed of hex-shaped structures 60 oriented normal to the twisted aerodynamic chord surface of the blade assembly. Structural core 34 twists with the other components of blade assembly 28 such that structural core 34 maintains a normal orientation relative to the chord through the twist range of the blade. Structural core 34 may be constructed in multiple sections or as a monolithic structure. Structural core 34 is configured to achieve beam, chord, and torsional stiffness requirements. Structural core 34 may include expanded surface areas (faying areas) on upper and lower surfaces to facilitate the bonding of core 34 to skin 36. Core 34 may include voids for placement of tuning weights. Skin 36 may be constructed as a monolithic structure and may include spanwise extending unidirectional material to serve as a primary centrifugal force load path of the blade assembly.

Blade assembly 28 can include different types of material, for example, centrifugal material, torque material, shear material or other material. Centrifugal material can include, for example, composite material (such as fibers or other composite material) aligned substantially spanwise on the span of the structural skin configured to carry centrifugal loads. Torque material can include, for example, composite material (such as fibers or other composite material) torsionally wound, for example around the skin, along the span of the blade. Shear material can include, for example, composite material (such as fibers or other composite material) which serves to capture and direct energy from outboard discrete elements, for example, abrasion strip, trailing edge or other elements, toward the blade attach bolt hole locations near the inboard end where all blade loads resolve. The shear material can include a combination of dominantly torque material and some centrifugal material or chord-wise material (or both).

Figure 5:
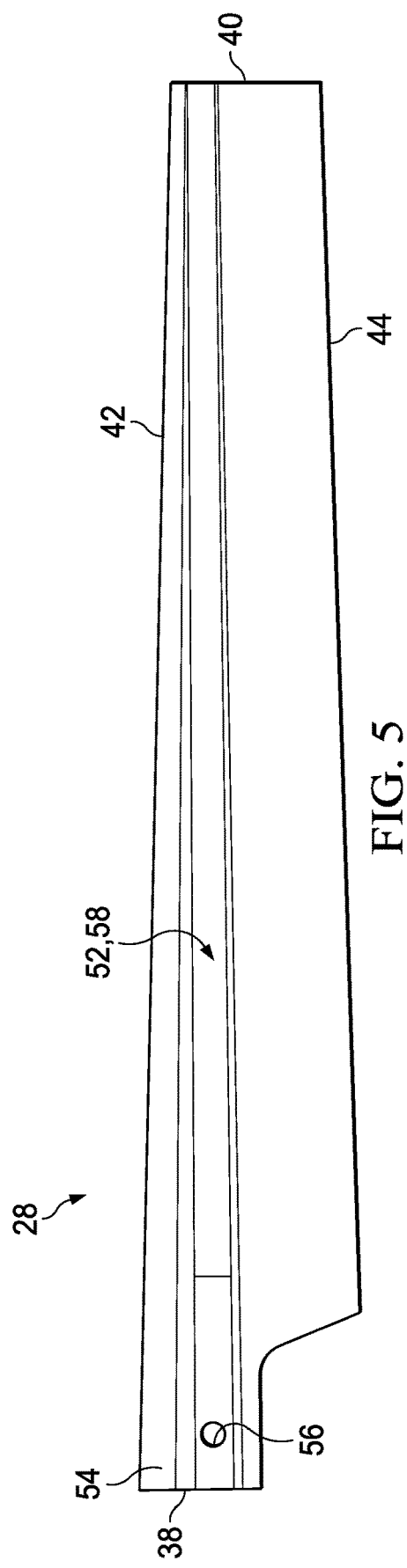
FIG. 5 is a top view of an exemplary proprotor blade assembly.

With reference in particular to FIGS. 4 and 5, structural skin 36 may be laid up, for example, as a single outer mold line (OML) layer. Skin 36 may be constructed as a monolithic structure having a top or upper skin portion 48 and a bottom or lower skin portion 50. Skin 36 may be constructed of conventional composite skin components, e.g., full body bias plies. Skin 36 may formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form high strength, lightweight solid composite members. Skin 36 may include a spanwise extending centrifugal force (CF) load path 52 extending from a cuff portion 54 that carries blade attach bolt hole 56. CF load path 52 may be formed on upper and lower skin portions 48, 50 by unidirectional spanwise strips of centrifugal material 58, for example, composite fibers.

FIGS. 6-9 illustrate aspects of an exemplary structural core 34. Structural core 34 is constructed for example by additive 3D printing of selective laser sintering (SLS) carbon, such as Carbon WINDFORM. Structural core 34 is constructed of a plurality of interconnected hex-shaped structures 60 having vertical walls 62 surrounding a central opening 63 and upper and lower caps 64. Caps 64 are flanged structures that may be of a larger thickness than walls 62 so as to create an increased sized outer faying area 66 for bonding to skin 36.

Figure 6:
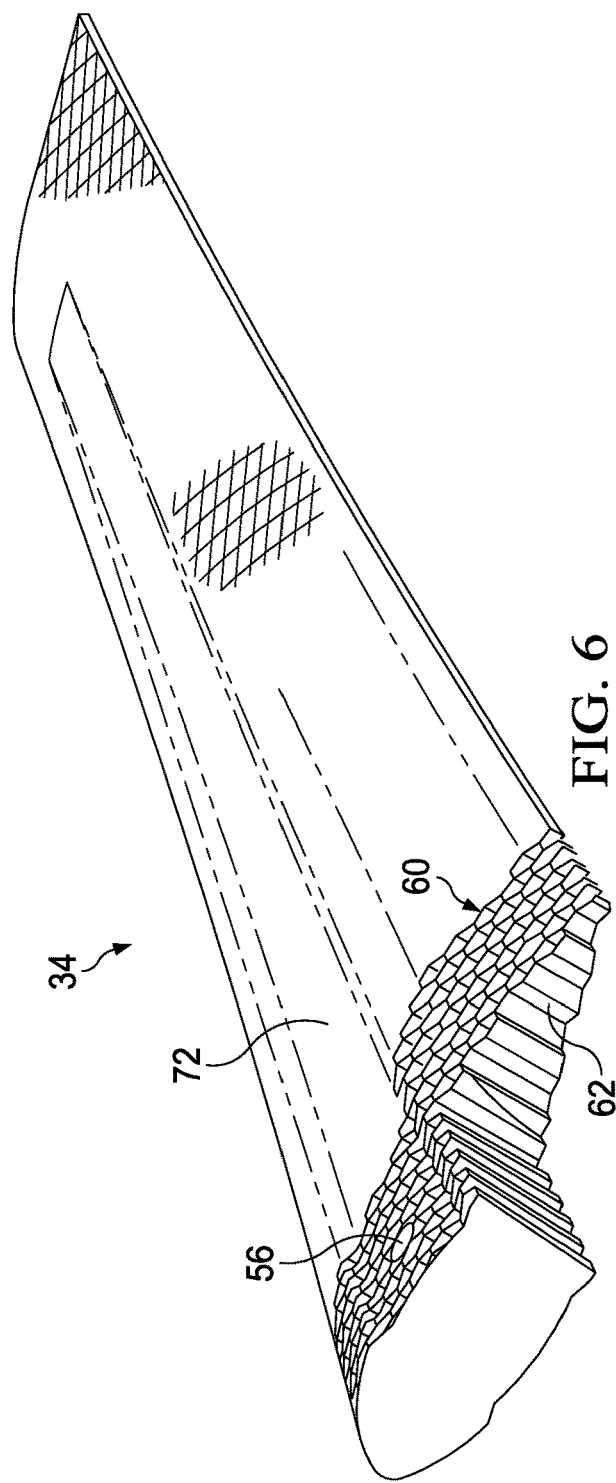
FIG. 6 illustrates an exposed inner mold line of an exemplary 3D printed structural core with hex-shaped structures.

Hex-shaped structures 60 are illustrated in FIG. 6 extending generally normal to the upper and lower surfaces of core 34 corresponding to the upper and lower skin profiles. Walls 62 extend generally normal to the skin surface. Hex-shaped structures 60 are constructed to be normal to the twisted aerodynamic chord surface 70 of blade 28 at all locations. Structural core 34 stays normal to the chord throughout the twist range. Hex-shaped structures 60 stay oriented normal to the twisted chord at all locations. Conventional cores do not twist with the blade assembly.

Figure 7:
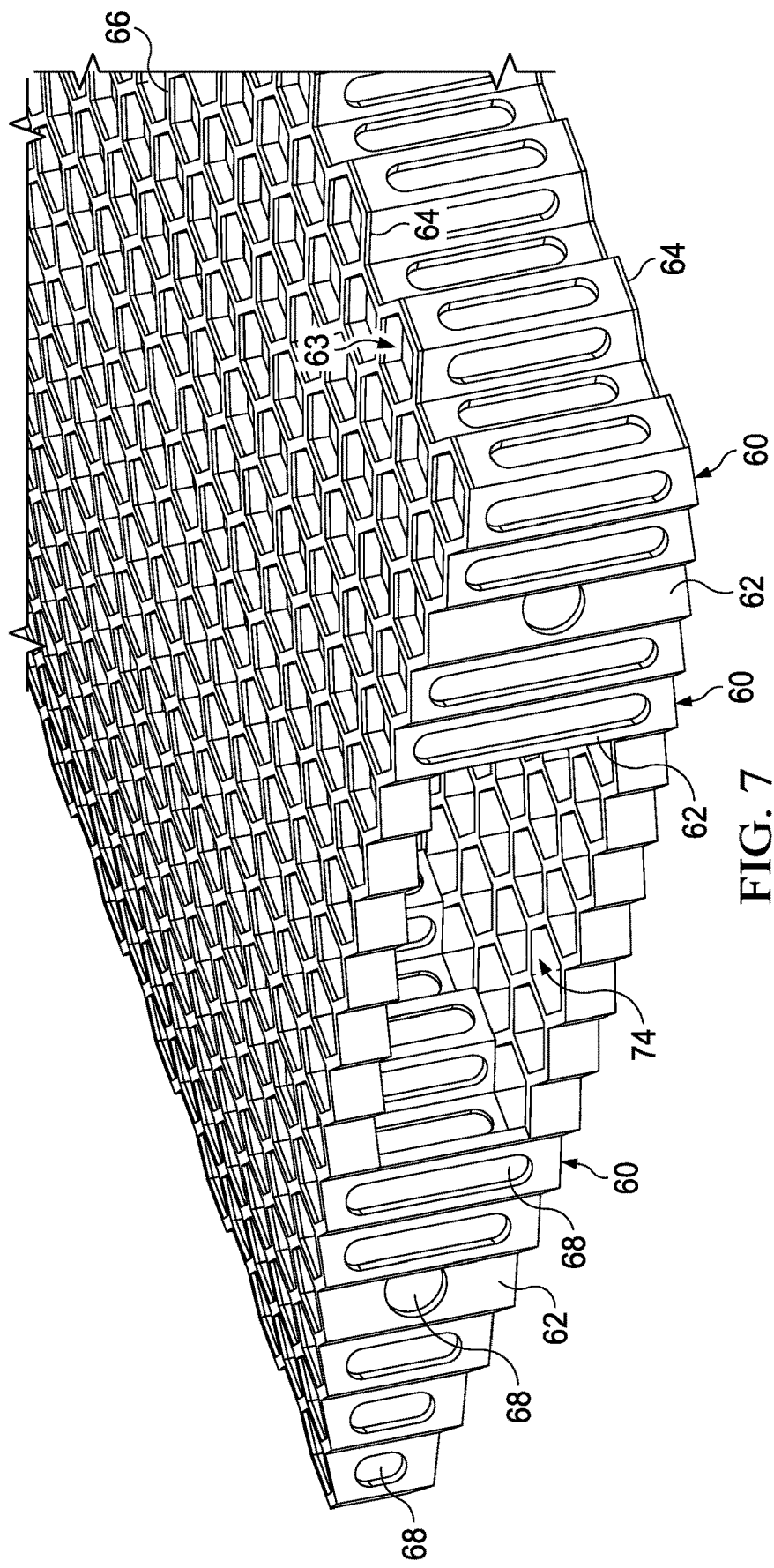
FIG. 7 illustrates exemplary aspects of an exemplary structural core of a proprotor blade assembly.

FIG. 7 illustrates hex-shaped structures 60 having different geometries and structural features to achieve targeted beam, chord, and torsional stiffness across the footprint of structural core 34. The geometry of hex-shaped structures 60 may vary across structural core 34, the lateral width or thickness of walls 62 may differ, and/or voids 74 may be formed in structural core 34 to achieve the structural stiffness targets. For example, the geometry of some hex-shaped structures 60 may be different from other hex-shaped structures 60. Similarly, a width of vertical walls 62 may be different in some hex-shaped structures 60 from other hex-shaped structures 60. In FIG. 7, openings 68 of different sizes are formed through some walls 62 resulting in hex-shaped structures 60 having different structural stiffness.

Figure 9:
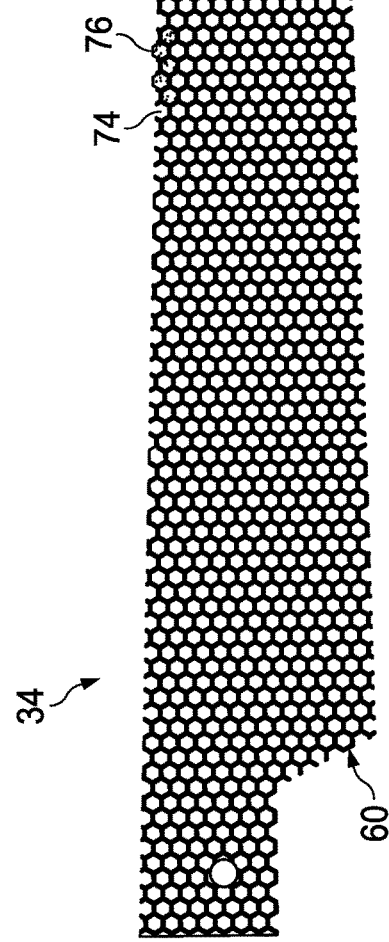
FIG. 9 is a top view of a structural core illustrating a tuning weight positioned in a recess or void in the structural core.

Structural core 34 may be constructed via additive 3D printing to achieve the designed hex-shaped structure 60 geometries and increased faying area 66 while providing various voids or recesses as may be desired for a particular blade assembly configuration. For example, FIG. 6 illustrates a recess 72 extending spanwise along the outer surface of structural core 34 to position CF lug 58 of skin 36, see, e.g. FIGS. 3 and 4. FIG. 9 illustrates a recess or void 74 formed in structural core 34 and holding a weight 76 for weight tuning. Structural core 34 may include one or more lead tuning weights 76, such as a tip tuning weight or a mid-span tuning weight.

Figure 10:
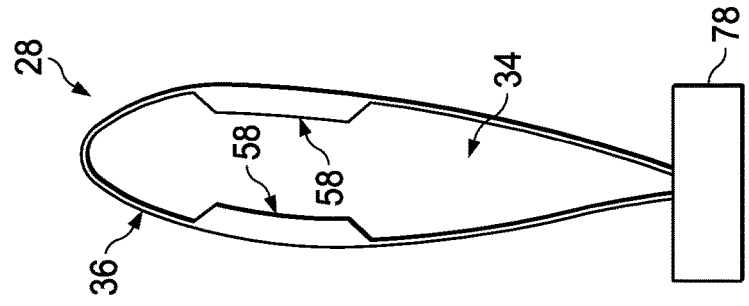
FIG. 10 schematically illustrates an IML tool concept of a proprotor blade assembly.
Figure 8:
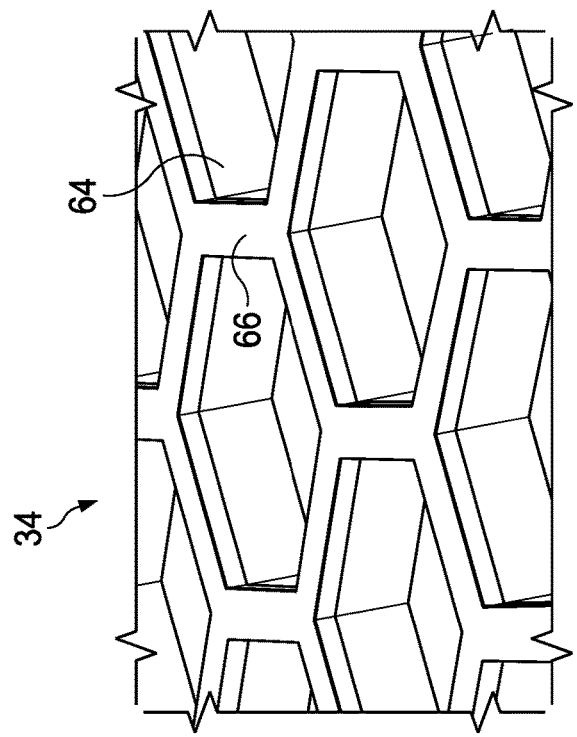
FIG. 8 is an expanded view of an exemplary structural core illustrating cap portions of hex-shaped structures with faying areas.

FIG. 10 schematically illustrates an exemplary blade assembly 28 set up in an IML tool 78 during manufacture. With additional reference to FIGS. 3-9, structural core 34 has been produced via additive 3D printing to have hex shape structures 60 oriented normal to the surface of skin 36. Skin 36 is positioned over structural core 34 and skin 36 is bonded to structural core 34 with an adhesive via faying area 66.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A proprotor blade assembly comprising:
   a structural skin extending spanwise from a root to a tip and along a chord from leading edge to a trailing edge;
   a structural core positioned inside of the structural skin, the structural core comprising hex-shaped structures oriented normal to the structural skin; and
   wherein the hex-shaped structures have vertical walls surrounding a central opening and upper and lower cap flanges having faying areas, the faying areas bonded to the structural skin.

2. The proprotor blade assembly of claim 1, wherein the structural skin does not dispose an internal tubular spar.

3. The proprotor blade assembly of claim 1, wherein the structural skin includes centrifugal force material extending spanwise.

4. The proprotor blade assembly of claim 1, wherein some of the hex-shaped structures have different geometries from other ones of the hex-shaped structures.

5. The proprotor blade assembly of claim 1, wherein the upper and lower cap flanges are thicker than the vertical walls.

6. The proprotor blade assembly of claim 1, wherein one or more of the hex-shaped structures comprises an opening extending laterally through one or more of the vertical walls.

7. The proprotor blade assembly of claim 1, wherein two or more the hex-shaped structures comprise an opening extending laterally through one or more of the vertical walls, wherein the openings of the hex-shaped structures are different sizes.

8. The proprotor blade assembly of claim 1, wherein some of the hex-shaped structures have different geometries from other ones of the hex-shaped structures.

9. The proprotor blade assembly of claim 1, wherein the structural skin includes centrifugal force material extending spanwise.

10. The proprotor blade assembly of claim 1, wherein the upper and lower cap flanges are thicker than the vertical walls; and
   one or more of the hex-shaped structures comprises an opening extending laterally through one or more the vertical walls.

11. The proprotor blade assembly of claim 10, wherein the structural skin includes centrifugal force material extending spanwise.

12. A rotorcraft comprising:
a fuselage;
a wing extending from the fuselage;
a proprotor assembly carried by the wing, the proprotor assembly comprising a plurality of proprotor blade assemblies each comprising:
a structural skin extending spanwise from a root to a tip and along a chord from leading edge to a trailing edge;
centrifugal force material forming a centrifugal force path;
a structural core positioned inside of the structural skin, the structural core comprising hex-shaped structures oriented normal to the structural skin; and
wherein the hex-shaped structures have vertical walls surrounding a central opening and upper and lower cap flanges having faying areas, the faying areas bonded to the structural skin, wherein the upper and lower cap flanges are thicker than the vertical walls.

13. The rotorcraft of claim 12, wherein the structural skin does not dispose an internal tubular spar.

14. The rotorcraft of claim 12, wherein some of the hex-shaped structures have different geometries from one or more of other ones of the hex-shaped structures.

15. The rotorcraft of claim 12, wherein the hex-shaped structures of a proprotor blade assembly of the plurality of proprotor blade assemblies are configured to extend normal to the structural skin when the proprotor blade assembly twists during flight.

16. The rotorcraft of claim 12, wherein one or more of the hex-shaped structures comprises an opening extending laterally through one or more of the vertical walls.

17. The rotorcraft of claim 12, wherein two or more the hex-shaped structures comprise an opening extending laterally through one or more of the vertical walls, wherein the openings of the hex-shaped structures are different sizes.

18. The rotorcraft of claim 12, wherein the upper and lower cap flanges are thicker than the vertical walls;
wherein one or more of the hex-shaped structures comprises an opening extending laterally through one or more the vertical walls; and
wherein the structural skin includes the centrifugal force material and the centrifugal force material extends spanwise.

19. The rotorcraft of claim 12, wherein the centrifugal force material extends spanwise along the structural skin.

* * * * *